United States Patent [19]

Nishiwaki

[11] Patent Number: 4,728,769

[45] Date of Patent: Mar. 1, 1988

[54] RESISTANCE WELDING ELECTRODE

[75] Inventor: Toshihiro Nishiwaki, Kawasaki, Japan

[73] Assignee: Obara Kinzoku Kogyo Kabushiki Kaisha, Tokyo, Japan

[21] Appl. No.: 938,330

[22] Filed: Dec. 3, 1986

Related U.S. Application Data

[63] Continuation of Ser. No. 763,374, Aug. 7, 1985, abandoned.

[30] Foreign Application Priority Data

Apr. 16, 1985 [JP] Japan ............................ 60-55549[U]

[51] Int. Cl.$^4$ ............................................. B23K 11/30
[52] U.S. Cl. ..................................... 219/120; 219/119
[58] Field of Search .............................. 219/119, 120

[56] References Cited

U.S. PATENT DOCUMENTS

| 2,379,187 | 6/1945 | Richards | 219/119 |
| 2,392,736 | 1/1946 | Hensel et al. | 219/120 |
| 3,426,172 | 2/1969 | Jost | 219/119 |
| 4,476,372 | 10/1984 | Prucher | 219/120 |

FOREIGN PATENT DOCUMENTS

| 2632251 | 1/1978 | Fed. Rep. of Germany | 219/120 |
| 3024067 | 1/1982 | Fed. Rep. of Germany | 219/120 |
| 517435 | 7/1976 | U.S.S.R. | 219/78.01 |
| 959953 | 9/1982 | U.S.S.R. | 219/119 |

Primary Examiner—E. A. Goldberg
Assistant Examiner—C. M. Sigda
Attorney, Agent, or Firm—Flynn, Thiel, Boutell & Tanis

[57] ABSTRACT

A resistance welding electrode includes a barrel-shaped portion having a cooling water passage defined therein and extending closely to an end surface thereof, and a cylindrical projection integrally formed on the end surface of the barrel-shaped portion. The cylindrical projection has a helical groove defined therearound, and may additionally have another helical groove defined therearound parallel to the first-mentioned helical groove in 180°-out-of-phase relation thereto. The cylindrical projection may have an axial slot defined in its circumferential surface across the helical groove.

5 Claims, 4 Drawing Figures

RESISTANCE WELDING ELECTRODE

This application is a continuation of U.S. Ser. No. 763,374, filed Aug. 7, 1985, now abandoned.

BACKGROUND OF THE INVENTION

1. Field of the Invention:

The present invention relates to a water-cooled electrode for being attached to the shank of a resistance welding machine.

2. Description of the Prior Art:

Conventional resistance welding electrodes of various types include a barrel-shaped portion leading to an electrode end portion and having a coolant passage defined therein. Since the coolant passage terminates short of the electrode end portion, the coolant flowing in the coolant passage has failed to cool the the electrode end portion sufficiently. The electrode end portion has an enlarged portion of a larger diameter. During repeated welding operations, the electrode end portion is deformed into a mushroom-like formation, which reduces the density of an electric current flowing through the electrode, thus failing to form a weld spot or nugget effectively.

One prior solution has been to form a cylindrical projection integrally with the end portion, the cylindrical projection having annular ridges and grooves thereon for reducing the mushroom-like deformation.

Such an electrode arrangement is disclosed in U.S. Pat. No. 4,476,372. As shown in FIG. 4 of the accompanying drawings, an electrode 11 has a coolant passage 12 defined therein and includes a cylindrical projection 14 extending from an end 13 and having integral annular ridges 15. The cylindrical projection 14 therefore has alternate larger and smaller diameters in the axial direction thereof. During repeated welding operations, the tip end of the cylindrical projection 14 is progressively worn and spread radially outwardly into a mushroom-like formation. Since the mushroom-like formation is cut off by the next groove, the prior electrode construction is effective in removing the mushroom-like formation. However, as the tip end of the cylindrical projection wears during repeated welding operations, it abruptly varies in diameter between the larger and smaller diameters, with the result that the density of an electric current flowing through the electrode is sharply varied alternately between high and low levels. The varying welding electric current is apt to form irregular weld spots or nuggets, with the consequence that no accurate and adequate welding operations will be carried out.

SUMMARY OF THE INVENTION

It is an object of the present invention to provide a resistance welding electrode which can effectively be cooled in welding operation.

Another object of the present invention is to provide a resistance welding electrode which is capable of preventing any mushroom-like formation from growing on a cylindrical projection in a welding process.

According to the present invention, there is provided a resistance welding electrode which includes a barrel-shaped portion having a cooling water passage defined therein and extending closely to an end surface thereof, and a cylindrical projection integrally formed on the end surface of the barrel-shaped portion. The cylindrical projection has a helical groove defined therearound, and may additionally have another helical groove defined therearound parallel to the first-mentioned helical groove in 180°-out-of-phase relation thereto. The cylindrical projection may have an axial slot defined in its circumferential surface across the helical groove.

During repeated welding operations, the tip end of the cylindrical projection is progressively worn and spread radially outwardly into a mushroom-like formation. However, the mushroom-like formation is cut off by the helical groove or grooves and prevented from growing on the cylindrical projection. Since the groove or grooves are helical, the cross-sectional area of the cylindrical projection remains unchanged during the welding process. Accordingly, the density of welding current flowing through the cylindrical projection is kept constant for accurate and adequate welding operation.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
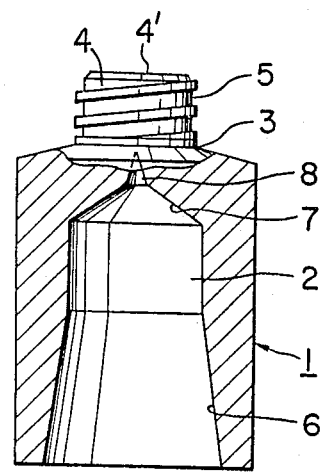
FIG. 1 is a side elevational view, partly in cross section, of a resistance welding electrode according to an embodiment of the present invention.

Identical or corresponding parts are denoted by identical or corresponding reference numerals throughout several views.

FIG. 1 shows a water-cooled resistance welding electrode according to an embodiment of the present invention. The resistance welding electrode, generally denoted at 1, includes a barrel-shaped portion having a cooling water passage 2 defined axially therein and extending to a position close to an end surface 3 of the barrel-shaped portion. The barrel-shaped portion also includes a tapered hollow portion 6 with its diameter progressively greater downwardly toward the lower end (as shown in FIG. 1) of the barrel-shaped portion. The electrode 1 can be attached to a resistance welding machine by inserting a shank thereof into the tapered hollow portion 6. The tapered hollow portion 6 leads to the cooling water passage 2 which is of a constant diameter to provide a uniform small wall thickness of the barrel-shaped portion above the tapered hollow portion 6. The passage 2 has an upper end communicating with a conical recess 7 tapered upwardly or having its diameter progressively reduced upwardly. The upper end of the conical recess 7 terminates in a pointed hole 8 coaxial with the electrode 1 and having a tip end extending closely to the end surface 3 of the barrel-shaped portion. Since the cooling water passage 2 makes the barrel-shaped portion thin and the pointed hole 8 communicating with the passage 2 through the conical recess 7 extends closely to the end surface 3, the electrode 1 can sufficiently be cooled by the cooling water flowing through the passage 2.

A cylindrical projection 4 is integrally formed on the end surface 3 of the barrel-shaped portion in coaxial relation thereto. The cylindrical projection 4 has, at its free or tip end, a substantially flat end surface 4', whereby the projection has a height of about 3 mm and a diameter which is about 1 mm larger than the standard nugget diameter of RWMA. The cylindrical projection 4 has a single helical groove 5 defined therearound.

During repeated welding operations, the cylindrical projection 4 is progressively worn from its tip end, and the melted material tends to spread radially outwardly into a mushroom-like formation. When the tip end of the cylindrical projection 4 is worn to the groove 5, the mushroom-like formation is cut off by the groove 5 since the diamter of the cylindrical projection 4 is sharply reduced at the groove 5. As a result, the mushroom-like formation is prevented from growing on the cylindrical projection 4. Since the groove 5 is helically defined around the cylindrical projection 4, the tip end of the helical groove 5 is progressively displaced around the cylindrical projection 4 as it is progressively worn. Therefore, the cross-sectional area of the cylindrical projection 4 remains constant at all times axially therealong in a welding process. The constant cross section of the cylindrical projection 4 allows a welding current to flow therethrough at a constant density.

In operation, two of the electrode according to the present invention are attached to the shanks of a resistance welding machine, and an electric current is passed through the electrodes and workpieces sandwiched therebetween while cooling water is supplied to the cooling water passage 2. The workpieces are then welded together at a weld spot or nugget formed therebetween, during which time the electrodes are sufficiently cooled by the cooling water in the cooling passage 2.

Figure 2:
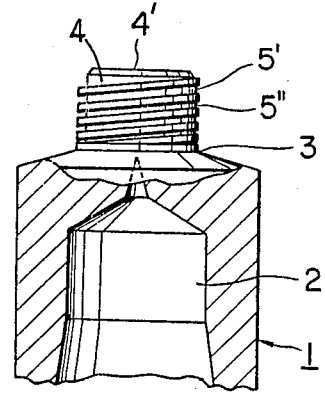
FIG. 2 is a fragmentary side elevational view, partly in cross section, of a resistance welding electrode according to another embodiment of the present invention.

FIG. 2 shows a resistance welding electrode according to another embodiment in which dual helical grooves 5', 5" are defined parallel to each other around the cylindrical projection 4. The helical grooves 5', 5" are shifted 180° out-of-phase around the cylindrical projection 4. Therefore, any mushroom-formation is always cut off at diametrically opposite points on the cylindrical projection 4. As a consequence, the resistance welding electrode shown in FIG. 2 is more efficient in cutting off the mushroom-like formation than the resistance welding electrode of FIG. 1 which has a single helical groove.

Figure 3:
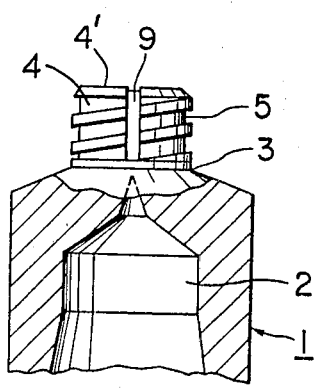
FIG. 3 is a view similar to FIG. 2, but showing a resistance welding electrode according to still another embodiment of the present invention.
Figure 4:
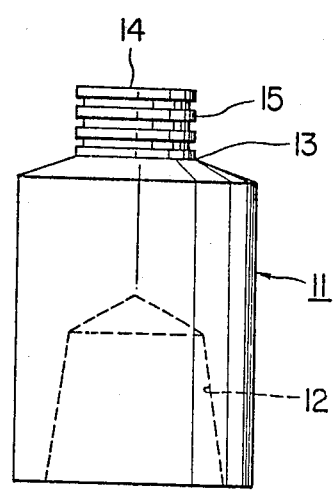
FIG. 4 is a side elevational view of a conventional resistance welding electrode.

A resistance welding electrode according to still another embodiment as shown in FIG. 3 differs from the electrode of FIG. 1 in that the cylindrical projection 4 has an axial slot 9 defined in its outer peripheral surface across the helical groove 5. The axial slot 9 serves to cut off any mushroom-like formation in a circumferential direction of the cylindrical projection 4. The helical groove 5 and the axial slot 9 are more effective in reducing the mushroom-like formation than the groove 5 only.

In the embodiments of FIGS. 2 and 3, the cross-sectional area of the cylindrical projection 4 in the axial direction thereof remains the same no matter how it is worn as the welding operation is repeated.

The helical groove 5, 5' or 5" in the foregoing embodiments has a rectangular cross section, but may have a triangular cross section or any other suitable cross sections.

Although certain preferred embodiments have been shown and described, it should be understood that many changes and modifications may be made therein without departing from the scope of the appended claims.

What is claimed is:

1. A resistance welding electrode, comprising:
   a substantially cylindrical barrel shaped body having an end surface and having an axial cooling water passage extending substantially to said end surface thereof, the peripheral wall of said barrel shaped body being free of axially distributed ridges and grooves;

means on said barrel shaped body for preventing deformation of said end surface of said barrel shaped body into a mushroom-like formation, said means comprising a reduced diameter, wearable cylindrical portion integrally formed on the central portion of said end surface of said barrel shaped body and projecting coaxially out therefrom and terminating at a free end for welding engagement with a work piece, the diameter of said cylindrical projection being substantially less than the diameter of said barrel shaped body, said cylindrical projection having axially distributed ridge portions axially separated by groove portions which successively cut off the mushroom-like spread of said free end of the cylindrical projection as said cylindrical projection wears during welding contact with work pieces;

said cylindrical projection having means preventing changes in the cross sectional area thereof during welding despite wearing down of said cylindrical projection axially past successive ones of axially aligned ones of said ridge and groove portions, with said wearing continuing substantially through the length of said cylindrical projection, said change preventing means comprising:

at lesat one helical groove winding around the periphery of said cylindrical projection from said end surface of said barrel shaped body to said free end of said cylindrical projection, said helical groove defining at least one corresponding helical ridge similarly winding around the periphery of said cylindrical projection, such that said free end of said cylindrical projection as it wears during welding always includes and exposes the end of at least one said helical ridge and the end of at least one said helical groove, wherein the exposed helical groove and ridge ends in effect are rotated around the perimeter of said cylindrical projection free end as the latter axially wears away during welding contact with work pieces, wherein said cylindrical projection free end is axially wearable to limit radially outward mushroom-like spread of its work piece contact area but without periodic contraction of said contact area, and such that said contact area remains substantially constant during axial wearing away of said cylindrical projection, said helical ridge and groove being structured like threads on a bolt wherein the radial depth of said helical groove is small compared to the radial thickness of material separating said helical groove from the central axis of said cylindrical projection, said helical groove being entirely offset axially from said water passage such that no part of said helical groove surrounds said water passage, the outside diameter of said helical ridge being substantially less than the outside diameter of said barrel shaped body.

2. A resistance welding electrode according to claim 1, wherein said cylindrical projection has a second helical groove defined therearound parallel to said first-mentioned helical groove and extending to the free end of said projection, said first and second helical grooves being shifted 180° out-of-phase around said cylindrical projection.

3. A resistance welding electrode according to claim 1, wherein said cylindrical projection has an external, axially-extending slot defined in its circumferential surface across said helical groove, said slot extending to the free end of said projection.

4. A resistance welding electrode according to claim 1, wherein said free end is defined by a substantially flat end surface, and said groove terminates at said flat end surface.

5. The apparatus of claim 1 in which said end surface of said barrel shaped body is a shallow convex end surface, at least the central portion of said water passage extending into the portion of said barrel shaped body defining said shallow convex end surface, said water passage extending substantially to the joinder of said cylindrical projection with said shallow convex end surface of said barrel shaped body.

* * * * *